United States Patent [19]

Onishi

[11] Patent Number: 5,504,174
[45] Date of Patent: Apr. 2, 1996

[54] CURABLE ORGANOPOLYSILOXANE COMPOSITION WITH CONDENSATION REACTION CURING AND ADDITION REACTION CURING

[75] Inventor: Masayuki Onishi, Ichihara, Japan

[73] Assignee: Dow Corning Toray Silicone Co., Ltd., Tokyo, Japan

[21] Appl. No.: 386,993

[22] Filed: Jan. 19, 1995

[30] Foreign Application Priority Data

Jan. 20, 1994 [JP] Japan .................................. 6-019854

[51] Int. Cl.$^6$ ............................................... C08G 77/08
[52] U.S. Cl. ................... 528/15; 528/17; 525/478
[58] Field of Search .................... 528/15, 17; 525/478

[56] References Cited

U.S. PATENT DOCUMENTS

| | | | |
|---|---|---|---|
| 4,269,753 | 5/1981 | Mine et al. ................. | 260/334 SB |
| 4,477,641 | 10/1984 | Matsumoto ................. | 528/15 |
| 4,921,880 | 5/1990 | Lee et al. ................. | 522/12 |
| 5,204,437 | 4/1993 | Ikeno et al. ................. | 528/15 |
| 5,314,979 | 5/1994 | Okinoshima et al. ................. | 528/15 |
| 5,364,921 | 11/1994 | Gray et al. ................. | 528/15 |

FOREIGN PATENT DOCUMENTS

| | | |
|---|---|---|
| 0449181 | 10/1991 | European Pat. Off. . |
| 0469890 | 2/1992 | European Pat. Off. . |
| 54-61242 | 5/1979 | Japan . |
| 55-118958 | 12/1980 | Japan . |
| 64-2626 | 1/1989 | Japan . |

OTHER PUBLICATIONS

European Search Report Dated Apr. 10, 1995.

*Primary Examiner*—Melvyn I. Marquis
*Attorney, Agent, or Firm*—Roger H. Borrousch

[57] ABSTRACT

A curable organopolysiloxane composition which cures freely, uninhibited by moisture or heat, and the cured silicone substance formed has excellent adhesive strength to various substrates when cured in contact with them. The curable organopolysiloxane composition 100 parts by weight of an organopolysiloxane mixture of an alkoxy-organopolysiloxane with a viscosity at 25° C. of 0.02–1,000 Pa.s and at least two silicon-bonded alkoxy groups in each molecule and an alkenyl-organopoly-siloxane with a viscosity at 25° C. of 0.02–1,000 Pa.s and at least two silicon-bonded lower alkenyl groups in each molecule; an organohydrogenpolysiloxane having at least two silicon-bonded hydrogen atoms in each molecule and in an amount such that there are 0.3–5 mols silicon-bonded hydrogen atom per one mol of the silicon-bonded lower alkenyl groups in the composition; 0.1–20 parts by weight of an alkoxysilane represented by the following formula or its partial hydrolysis condensate $$R^1_a Si(OR^2)_{(4-a)}$$

where $R^1$ represents a monovalent hydrocarbon group, $R^2$ represents alkyl group or alkoxy group-substituted alkyl group, and a is 0, 1, or 2); 0.01–20 parts by weight of a titanium-catalyst for a condensation reaction, and a catalytic amount of hydrosilylation reaction catalyst.

20 Claims, No Drawings

CURABLE ORGANOPOLYSILOXANE COMPOSITION WITH CONDENSATION REACTION CURING AND ADDITION REACTION CURING

BACKGROUND OF THE INVENTION

1. Field of the Invention

This invention relates to a type of curable organopolysiloxane composition. More specifically, this invention relates to a type of curable organopolysiloxane composition that cures freely, uninhibited by moisture or heat, and it can form a cured silicone substance with excellent adhesive strength to various substrates which it is in contact during curing.

2. Background Information and Prior art

Curable organopolysiloxane compositions can be classified into the following groups: condensation-reaction curable organopolysiloxane compositions, which are cured by means of moisture, addition-reaction curable organopolysiloxane compositions, which are cured at room temperature or by heating, and radical-reaction curable organopolysiloxane compositions, which are cured by heating.

A condensation-reaction curable organopolysiloxane composition cures easily when it is in contact with atmospheric moisture to form a cured silicone substance and has a high resistance to any inhibition to its curing. This is an advantage. In particular, by using a titanium-type catalyst for the condensation reaction of a condensation curable alkoxy-organopolysiloxane composition which produces alcohol during the curing process, can form a cured silicone substance with excellent adhesive strength to the various substrates in contact with it during the curing process. There is no offensive odor in the curing process, and there is no corrosion of the metals of the substrates or metals adjacent to the cured silicone substance. Consequently, these types of compositions are preferably used in manufacturing sealants and coating materials which are used in manufacturing electrical and electronic equipment.

For an addition-reaction curable organopolysiloxane composition, curing can be performed quickly and in deep section at room temperature or by heating, and is free of reaction by-products during curing. It is preferred as a potting material or as a coating material for manufacturing electrical and electronic equipment.

PROBLEMS TO BE SOLVED BY THE INVENTION

However, for the aforementioned condensation-reaction curable alkoxy-organopolysiloxane composition, curing occurs more readily in the portion in contact with atmospheric moisture. Consequently, a long time is needed for the curing to reach the entire depth of the composition layer. Consequently, when such curable organopolysiloxane composition is used to adhere parts of electrical and electronic circuits, the adhesive strength is low, and film strength is low, if the allowed curing time is too short. Consequently, when the composition is cured, a long setting time is needed before the substrate is moved for processing in the next stage of production. This is a disadvantage. Also, for the aforementioned addition-reaction curable organopolysiloxane composition, adhesive strength is low with respect to various types of substrates fox the cured silicone substance obtained by this curing method. Consequently, it is necessary to perform primer processing steps on the surface of the substrates. As a result, the bonding operation becomes complicated. This is a disadvantage.

For an addition-reaction curable organopolysiloxane composition, the curing process is easily inhibited by nitrogen-containing compounds, sulfur-containing compounds, phosphorus-containing compounds, tin-containing compounds, sulfur, soldering flux, etc. This is a disadvantage. When this addition-reaction curable organopolysiloxane composition is used to adhere parts of an electrical or electronic circuit, the substrate must be cleaned beforehand.

In order to solve the aforementioned problems, a type of condensation-reaction curable organopolysiloxane composition made of an organopolysiloxane having at least two silicon-bonded alkoxy groups and at least two silicon-bonded lower alkenyl groups in each molecule, an organopolysiloxane having at least two silicon-bonded hydrogen atoms in each molecule, and a catalyst for hydrosilylation has been proposed by Matsumoto in U.S. Pat. No. 4,477,641, issued Oct. 16, 1984, (Japanese Kokoku Patent No. Sho 64[1989]-2626). However, for the curable organopolysiloxane composition proposed by Matsumoto, the inhibition curing problems are not completely solved, and the adhesive strength of the cured silicone substance is not sufficient.

In order to solve the aforementioned problems, the present inventors have performed extensive research. As a result of this research work, the present invention was realized.

SUMMARY OF THE INVENTION

The purpose of this invention is to provide a type of curable organopolysiloxane composition which cures freely, uninhibited by moisture or heat, and forms a cured silicone substance with excellent adhesive strength to various substrates in contact with it during the curing process.

MEANS FOR SOLVING THE PROBLEMS AND FUNCTION

This invention relates to curable organopolysiloxane composition consisting essentially of the following components:

(A) 100 parts by weight of an organopolysiloxane mixture of (a) an alkoxy-organopolysiloxane with a viscosity at 25° C. of 0.020 to 1,000 Pa.s and at least two silicon-bonded alkoxy groups in each molecule and (b) an alkenyl-organopolysiloxane with a viscosity at 25° C. of 0.020 to 1,000 Pa.s and at least two silicon-bonded lower alkenyl groups in each molecule;

(B) an organohydrogenpolysiloxane having at least two silicon-bonded hydrogen atoms in each molecule and said organohydrogenpolysiloxane being present in a weight amount to ensure that there are 0.3–5 mols silicon-bonded hydrogen atoms in component (B) for 1 mol of the silicon-bonded lower alkenyl groups in the composition;

(C) 0.1–20 parts by weight of an alkoxysilane, based on 100 parts by weight of (A), represented by the following formula or its partial hydrolysis condensate:

$$R^1_a Si(OR^2)_{(4-a)}$$

where $R^1$ represents a monovalent hydrocarbon group, $R^2$ represents an alkyl group or alkoxy group-substituted alkyl group, and a is 0, 1, or 2;

(D) 0.01–20 parts by weight of a titanium catalyst for a condensation reaction, based on 100 parts by weight of (A); and (E) a catalytic amount of hydrosilylation reaction catalyst.

This invention also relates a curable organopolysiloxane composition consisting essentially of a two-container liquid composition made of composition (I) and composition (II) where the sum amount of component (a) and component (b) is 100 parts by weight:

(1) composition (I) consisting essentially of
   (b) an alkenyl-organopolysiloxane with a viscosity at 25° C. of 0.02 to 1,000 Pa.s and at least two silicon-bonded lower alkenyl groups in each molecule;

(D) 0.01–20 parts by weight of a titanium catalyst for a condensation reaction, based on 100 parts by weight of component (a) and component (b); and (E) a catalytic amount of a hydrosilylation reaction catalyst;

(2) composition (II) consisting essentially of organopolysiloxane selected from the group consisting of
   (a) an alkoxy-organopolysiloxane with a viscosity at 25° C. of 0.02 to 1,000 Pa.s and at least two silicon-bonded alkoxy groups in each molecule, and (A) an organopolysiloxane mixture of (a) an alkoxy-organopolysiloxane with a viscosity at 25° C. of 0.02 to 1,000 Pa.s and at least two silicon-bonded alkoxy groups in each molecule, and (b) an alkenyl-organopolysiloxane with a viscosity at 25° C. of 0.02 to 1,000 Pa.s and at least two silicon-bonded alkenyl groups in each molecule;

(B) an organohydrogenpolysiloxane which has at least two silicon-bonded hydrogen atoms in each molecule and said organohydrogenpolysiloxane being present in a weight amount to ensure that there are 0.3 to 5 mols of silicon-bonded hydrogen atoms in component (B) for one mol of silicon-bonded lower alkenyl group in the composition; and (C) 0.1–20 parts by weight of the alkoxysilane, based on 100 parts by weight of component (a) and component (b) in composition (I) and composition (II), represented by the formula or its partial hydrolysis condensate

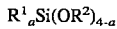
$R^1_a Si(OR^2)_{4-a}$ where $R^1$ represents a monovalent hydrocarbon group, $R^2$ represents an alkyl group or alkoxy group-substituted alkyl group, and a is 0, 1, or 2.

DETAILED DESCRIPTION OF THE PREFERRED EMBODIMENTS

The organopolysiloxane mixture, component (A), is a major component of the composition of this invention. It is an organopolysiloxane mixture of (a) an alkoxy-organopolysiloxane with a viscosity at 25° C. of 0.02 to 1,000 Pa.s and at least two silicon-bonded alkoxy groups in each molecule, and (b) an alkenyl-organopolysiloxane with a viscosity at 25° C. of 0.02 to 1,000 Pa.s, and at least two silicon-bonded lower alkenyl groups in each molecule. In component (A), it is preferred that the content of component (a) is 10–90 wt %, and the content of component (b) is 10–90 wt % and the sum of the weight of (a) and (b) is 100 wt % and is component (A). The more preferred compositions have (a) present in an amount of from 40 to 60 weight percent and (b) present in an amount of from 40 to 60 weight percent where the sum of the weight of (a) and (b) is 100 weight percent.

For the alkoxy-organopolysiloxane, component (a), there are at least two silicon-bonded alkoxy groups in each molecule. This is because, when there are less than two silicon-bonded alkoxy groups in each molecule of component (a), the curing property of the composition obtained is insufficient, and the curing is easily inhibited. There is no special limitation on the molecular structure of component (a), which may take a straight-chain form (linear), branched form, cyclic form, or resin form. Among them, the straight-chain form is preferred. Examples of the silicon-bonded alkoxy groups in component (a) include methoxy, ethoxy, propoxy, butoxy, etc. Among them, methoxy is preferred. In component (a), the silicon-bonded alkoxy groups may be located anywhere. However, from the viewpoint of the curing property, it is preferred that they are present at least at the terminals of the molecular chain. Examples of possible molecular chain terminal groups in component (a) include trimethoxysiloxy, methyldimethoxysiloxy, phenyldimethoxysiloxy, triethoxysiloxy, methyldiethoxysiloxy, and other alkoxysiloxy; trimethoxysilylethyl, trimethoxysilyl-propyl, methyldimethoxysilylethyl, methyldimethoxysilylpropyl, triethoxysilylethyl, and other alkoxysilylalkyl. Among them, trimethoxysiloxy is preferred. Examples of silicon-bonded organic groups other than the silicon-bonded alkoxy groups in component (a) include alkyl, such as methyl, ethyl, propyl, butyl, pentyl, hexyl, heptyl, octyl, nonyl, decyl, octadecyl, and other alkyl groups; cyclopentyl, cyclohexyl, and other cycloalkyl groups; phenyl, tolyl, xylyl, naphthyl, and other aryl groups; benzyl, phenethyl, phenylpropyl, and other aralkyl groups; 3-chloropropyl, 3,3,3-trifluoropropyl, and other halo-substituted alkyl groups. Among them, methyl and phenyl are preferred.

The preferred organopolysiloxanes, component (a), are the straight-chain organopolysiloxanes are represented by the following formula:

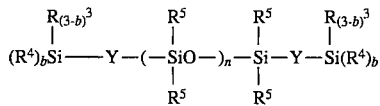

where $R^3$ represents a monovalent hydrocarbon group, $R^4$ represents an alkoxy group, $R^5$ represents a monovalent hydrocarbon group, Y represents an oxygen atom or bivalent hydrocarbon radical, b is 1, 2, or 3, n represents a number corresponding to a polymer with a viscosity at 25° C. of 0.02 to 1,000 Pa.s. Examples of the monovalent hydrocarbon groups of $R^3$ include methyl, ethyl, propyl, butyl, pentyl, hexyl, heptyl, octyl, nonyl, decyl, octadecyl, and other alkyl groups; cyclo-pentyl, cyclohexyl, and other cycloalkyl groups; phenyl, tolyl, xylyl, naphthyl, and other aryl groups; benzyl, phenethyl, phenylpropyl, and other aralkyl groups; 3-chloropropyl, and 3,3,3-trifluoropropyl. Among them, methyl is preferred for $R^3$. Examples of the alkoxy groups of $R^4$ include methoxy, ethoxy, propoxy, and buthoxy. Among them, methoxy is preferred for $R^4$. Examples of the monovalent hydrocarbon groups of $R^5$ include the same types of monovalent hydrocarbon groups as for $R^3$. Among them, methyl and phenyl are preferred. Y represents an oxygen atom or bivalent hydrocarbon group. Preferred types of the bivalent hydrocarbon groups of Y include alkylene radicals. Preferred types of the alkylene radicals include ethylene, propylene, and methylethylene. Among them, ethylene and propylene radicals are preferred. Also, in the formula, b is 1, 2, or 3, and n represents the number corresponding to a viscosity of the organopolysiloxane represented by the aforementioned formula at 25° C. of 0.02–1,000 Pa.s.

The viscosity of component (a) at 25° C. should be 0.02 to 1,000 Pa.s, preferably 0.1–500 Pa.s, and more preferred viscosity is 1–25 Pa.s. If the viscosity of component (a) at 25° C. is less than 0.02 Pa.s, the physical properties of the obtained cured silicone substance are degraded. In particular, softness and elongation are degraded significantly. On the other hand, if the viscosity is greater than 1,000 Pa.s, the viscosity of the composition obtained is too high, and the operability is degraded.

The alkenyl-organopolysiloxane, component (b), has at least two silicon-bonded lower alkenyl groups in each molecule. This is because, when there are less than two silicon-bonded lower alkenyl groups in each molecule of component (b), the cured substance obtained, fails to have a sufficient curing properly. There is no special limitation on the molecular structure of the component (b). For example, it may have a straight-chain form (linear), a straight-chain form with partial branching, branched-chain form, cyclic form, or resin form. Among these forms, the straight-chain structure and resin structure are preferred. Preferred resin structures are made of $SiO_{4/2}$ siloxane units, $(CH_3)_3SiO_{1/2}$ siloxy units, and $(CH_3)_2(CH_2=CH)SiO_{1/2}$. Examples of the silicon-bonded lower alkenyl groups in component (b) are those lower alkenyl groups having from 1 to 6 carbon atoms per group inclusive and include vinyl, allyl, butenyl, pentenyl, and hexenyl. Among them, vinyl is preferred. In component (b), the silicon-bonded lower alkenyl groups may be located anywhere. However, from the viewpoint of the curing property, it is preferred that they are present at least at the terminals of the molecular chain. Examples of possible molecular chain terminal groups in component (b) include trimethylsiloxy, dimethylvinylsiloxy, dimethylphenylsiloxy, methylvinylphenylsiloxy. Among them, trimethylsiloxy and dimethylvinylsiloxy are preferred. Examples of silicon-bonded organic groups other than the silicon-bonded lower alkenyl groups in component (b) include methyl, ethyl, propyl, butyl, pentyl, hexyl, heptyl, octyl, nonyl, decyl, octadecyl, and other alkyl groups; cyclopentyl, cyclohexyl, and other cycloalkyl groups; phenyl, tolyl, xylyl, naphthyl, and other aryl groups; benzyl, phenethyl, phenylpropyl, and other aralkyl groups; 3-chloropropyl, and 3,3,3-trifluoropropyl. Among them, methyl is preferred.

The viscosity of component (b) at 25° C. should be 0.020 to 1,000 Pa.s, preferably 0.1 to 500 Pa.s, and more preferred viscosity is 1 to 25 Pa.s. If the viscosity of component (b) at 25° C. is less than 0.02 Pa.s, the physical properties of the obtained cured silicone substance are degraded. In particular, softness and elongation are degraded significantly. On the other hand, if the viscosity is greater than 1,000 Pa.s, the viscosity of the composition obtained is too high, and operability is degraded.

The hydrogen-organopolysiloxane, component (B), serves as a crosslinking agent for component (b) to cure the composition. It has at least two silicon-bonded hydrogen atoms in each molecule. There is no special limitation on the molecular structure of the component (B). For example, it may have a straight-chain form (linear), straight-chain form with partial branching, cyclic form, or resin form. Among these forms, the straight-chain form is preferred. Examples of silicon-bonded organic groups other than the silicon-bonded hydrogen atoms in component (B) include alkyl, such as methyl, ethyl, propyl, butyl, pentyl, hexyl, heptyl, octyl, nonyl, decyl, octadecyl, and other alkyl groups; cyclopentyl, cyclohexyl, and other cycloalkyl groups; phenyl, tolyl, xylyl, naphthyl, and other aryl groups; benzyl, phenethyl, phenylpropyl, and other aralkyl groups; 3-chloropropyl group, and 3,3,3-trifluoropropyl. Among them, methyl and phenyl are preferred. There is no special limitation on the viscosity of component (B). However, it is preferred that the viscosity be 0.001 to 10 Pa.s, and a more preferred viscosity is from 0.005 to 1 Pa.s.

The amount of component (B) added should be appropriate to ensure that the amount of the silicon-bonded hydrogen atoms in component (B) is 0.3–5 mols with respect to 1 mol of the silicon-bonded lower alkenyl groups in the composition. If the amount of component (B) added corresponds to less than 0.3 mol of the silicon-bonded hydrogen atoms in component (B) per one mol of lower alkenyl in the composition, curing of the composition obtained is insufficient. On the other hand, when the amount corresponds to greater than 5 mols of the silicon-bonded hydrogen atoms per one mol of lower alkenyl in the composition, hydrogen gas is generated during the curing process of the composition, and the heat resistance of the cured silicone substance obtained is degraded significantly. The aforementioned condition can usually be realized by adding 0.5–50 parts by weight of component (B) with respect to 100 parts by weight of component (b) in component (A).

The alkoxysilane or its partial hydrolysis condensate, component (C), serves as a crosslinker for the alkoxy-organopolysiloxane, component (a), to cure the composition. It is an alkoxysilane represented by the following formula or its partial hydrolysis condensate:

$$R^1{}_a Si(OR^2)_{(4-a)}$$

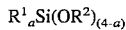

where $R^1$ represents a monovalent hydrocarbon group, $R^2$ represents alkyl group or alkoxy group-substituted alkyl group, and a is 0, 1, or 2. Examples of the monovalent hydrocarbon groups that can be used as $R^1$ include methyl, ethyl, propyl, butyl, pentyl, hexyl, heptyl, octyl, nonyl, decyl, octadecyl, and other alkyl groups; cyclopentyl, cyclohexyl, and other cycloalkyl groups; vinyl, allyl, and other alkenyl groups; phenyl, tolyl, xylyl, naphthyl, and other aryl groups; benzyl, phenethyl, phenylpropyl, and other aralkyl groups; 3-chloropropyl, and 3,3,3-trifluoropropyl. Among them, methyl is preferred. $R^2$ represents an alkyl group or alkoxy group-substituted alkyl group. Examples of the alkyl groups that can be used as $R^2$ include methyl, ethyl, propyl, butyl, pentyl, hexyl, heptyl, octyl, nonyl, decyl, and octadecyl. Among them, methyl is preferred. Examples of the alkoxy group-substituted alkyl groups of $R^2$ include methoxypropyl and methoxybutyl. In the aforementioned formula, a is 0, 1, or 2.

Examples of the alkoxysilane or its partial hydrolysis condensate as component (C) include tetramethoxysilane, tetraethoxysilane, methyl Cellosolve orthosilicate, and other tetrafunctional alkoxysilanes; methyltrimethoxysilane, methyltriethoxysilane, ethyltrimethoxysilane, vinyltrimethoxysilane, phenyltrimethoxysilane, methyltrimethoxyethoxysilane, and other tri-functional alkoxysilanes; dimethyldimethoxysilane, diphenyldimethoxysilane, and other bi-functional alkoxysilanes; as well as the partial hydrolysis condensates of these alkoxysilanes. They may be used either alone or as a mixture of several types or as hydrolysis condensates. The preferred alkoxysilane is methyltrimethoxysilane.

The amount of component (C) is present in an amount of from 0.1–20 parts by weight, preferably 1–10 parts by weight, with respect to 100 parts by weight of component (A). If the amount of component (C) added with respect to 100 parts by weight of component (A) is less than 0.1 part by weight, the composition obtained is not well-cured;

thickening or gelation may take place easily during storage, and the adhesive strength of the obtained cured silicone substance is poor. On the other hand, if the amount is greater than 20 parts by weight, the curing property of the composition obtained is degraded significantly, which is undesirable from an economical point of view.

The titanium catalyst (D) for the condensation reaction is used for promoting the crosslinking reaction of components (a) and (C) to cure the composition of this invention. Organic titanic esters, organic titanium chelate compounds, and other conventional titanium catalysts for condensation reactions can be used. Examples of the titanium catalyst for the condensation reaction as component (D) include tetrabutyl titanate, tetraisopropyl titanate, diisopropoxybis(acetylacetonate)titanium, diisopropoxybis(ethylacetoacetate)titanium, and other titanium compounds.

The amount of component (D) added with respect to 100 parts by weight of component (A) is from 0.01–20 parts by weight, preferably 0.1–5 parts by weight. If the amount of component (D) is less than 0.01 part by weight with respect to 100 parts by weight of component (A), curing is slow in the composition obtained, and easily inhibited. On the other hand, when the amount is greater than 20 parts by weight, the storage stability of the composition obtained is poor.

The hydrosilylation reaction catalyst, component (E), is a catalyst that promotes the addition reaction of components (b) and (B) to cure the composition. It is possible to make use of platinum compounds, tetrakis(triphenylphosphine)palladium, and other palladium compounds, rhodium compounds, and other conventional catalysts for hydrosilylation reactions. Preferred hydrosilylation reaction catalysts are the platinum compounds. Examples of the platinum compounds that can be used as component (E) include platinum black, platinum-carrying activated carbon, platinum-carrying silica powder, chloroplatinic acid, an alcohol solution of chloroplatinic acid, a complex of platinum and an olefin, and a complex of platinum and a vinylsiloxane.

There is no special limitation on the amount of the catalyst added as component (E). However, the amount of the catalyst metal in component (E) with respect to 1 million parts by weight of component (A) is preferably 0.1–1,000 parts by weight, more preferably 0.5–200 parts by weight.

The curable organopolysiloxane composition of this invention can be prepared by uniformly blending the aforementioned components (A)–(E). The composition of this invention can be stored in single-liquid form (a one-container composition). However, in this form, the curing property may be degraded during storage. Consequently, it is preferred that it be stored in a 2-liquid form of a composition (I) liquid and a composition (II) liquid (a two-container composition), with composition (I) and composition (II) being uniformly blended with each other immediately before application. In particular, among the various possible combinations of the aforementioned components, a combination of composition (I) made of said components (b), (D) and (E), and composition (II) made of said components (a), (B), and (C) or said components (A), (B), and (C) is most preferred.

The curable organopolysiloxane composition of this invention can be prepared by uniformly blending the aforementioned components (A)–(E). In order to improve the storage stability of this composition and to improve the processability, a curing inhibitor can be added as an arbitrary component. Examples of the curing inhibitor include 3-methyl-1-butyl-3-ol, 3,5-dimethyl-1-hexyne-3-ol, phenylbutynol, and other acetylene compounds; 3-methyl-3-penten-1-yne, 3,5-dimethyl-3-hexen-1-yne, and other enyne compounds; 1,3,5,7-tetramethyl-1,3,5,7-tetravinylcyclotetrasiloxane, 1,3,5,7-tetramethyl-1,3,5,7-tetrahexenylcyclotetrasiloxane, benzotriazole, and other triazoles; phosphines; mercaptans; hydrazines; etc. The amount of the curing inhibitor used can be selected appropriately according to the curing conditions of the composition of this invention. For example, the amount can be selected as 0.001–5 parts by weight with respect to 100 parts by weight of component (A).

The curable organopolysiloxane composition of this invention can also contain fillers as another arbitrary component. Examples of the fillers that can be added include dry silica powder, wet silica powder, quartz powder, calcium carbonate powder, titanium dioxide powder, diatomaceous earth powder, aluminum oxide powder, aluminum hydroxide powder, zinc oxide powder, zinc carbonate powder, and other inorganic fillers, as well as inorganic fillers prepared by performing surface processing of the aforementioned inorganic fillers using methyltrimethoxysilane, hexamethyldisilzane, and other organosilazanes; alpha,omega-silanol endblocked dimethylsiloxane oligomer, alpha,omega-silanol endblocked methylphenylsiloxane oligomer, alpha,omega-silanol endblocked methylvinylsiloxane oligomer, and other siloxane oligomers, and other processing agents. To the curable organopolysiloxane composition of this invention the following can also be added toluene, xylene, acetone, methyl ethyl ketone, methyl isobutyl ketone, hexane, heptane, and other organic solvents; alpha,omega-trimethylsiloxy endblocked dimethylpolysiloxane, alpha,omega-trimethylsiloxy endblocked methylphenylpolysiloxane, and other noncrosslinked diorganopolysiloxanes; fire retardants, heat-resistance agents, plasticizers, thixotropic agents, bonding promoters, and mildew proofing agents.

In the following examples, the curable organopolysiloxane composition of this invention will be explained in more detail with reference to the examples. The viscosity in the examples refers to values measured at 25° C. and "part" and "parts" represent "part by weight" and "parts by weight" respectively. The grades of the adhesive strength in the application examples are defined as follows: G=good bonding; P=partial bonding; N=no bonding.

EXAMPLE 1

100 parts of an organopolysiloxane mixture prepared by uniformly blending 50 parts of alpha,omega-trimethoxysiloxy-endblocked dimethylpolysiloxane with a viscosity of 15 Pa.s and 50 parts by weight of a vinyl-containing siloxane copolymer with vinyl content of 1 wt % a viscosity of 7 Pa.s, made of siloxane units represented by the formula $SiO_{4/2}$, siloxy units represented by the formula $(CH_3)_3SiO_{1/2}$, and siloxy units represented by $(CH_3)_2(CH_2=CH)SiO_{1/2}$ were blended uniformly with the following components: 6 parts of dry silica powder with a BET specific surface area of 200 $m^2/g$ and having surface treated by hexamethyldisilazane, 3 parts of alpha,omega-trimethylsiloxy endblocked dimethylsiloxane-methylhydrogensiloxane copolymer with a content of silicon-bonded hydrogen atoms of 0.7 wt % and a viscosity of 0.01 Pa.s, an isopropyl alcohol solution of chloroplatinic acid in an amount corresponding to 5 ppm of the platinum metal with respect to the aforementioned organopolysiloxane mixture, 2 parts of methyltrimethoxysilane, and 2 parts of diisopropoxybis(ethylacetoacetate)titanium. In this way, a curable organopolysiloxane composition of this invention was formed.

According to JIS K 6850, the curable organopolysiloxane composition prepared above was coated at a thickness of 1 mm between two aluminum sheets, followed by heating at 120° C. in a hot-air-circulating oven for 30 min, forming a bonded specimen. Also, a bonded specimen was prepared by setting [a specimen similar to the one prepared above] under conditions of 20° C. and 55% RH for 7 days after the aforementioned heat treatment. For the bonded specimen prepared by heat treatment alone and the bonded specimen prepared by being set under the conditions of 20° C. and 55% RH for 7 days after the aforemen-tioned heat treatment, the shear adhesive strength was measured, and the results were as listed in Table I. Also the curable organopolysiloxane composition was coated in bead form on the substrate listed in Table I, followed by heating at 120° C. in the hot-air-circulating oven for 30 min. Then, the specimen was set under the conditions of 20° C. and 55% RH for 7 days. The bonding property was evaluated for the bonded specimen prepared by heat treatment alone and the bonded specimen prepared by being set under conditions of 20° C. and 55% RH for 7 days after the aforementioned heat treatment; the results were as listed in Table I.

COMPARATIVE EXAMPLE 1

A comparative curable organopolysiloxane composition was prepared by blending uniformly 100 parts of alpha, omega-trimethoxysiloxy endblocked dimethylpolysiloxane with viscosity of 15 Pa.s, 6 parts of dry silica powder with a BET specific surface area of 200 m²/g and having been surface-treated by hexamethyldisilazane, 4 parts of methyltrimethoxysilane, and 4 parts of diisopropoxybis(ethylacetoacetate)titanium. In the same way as in Example 1, the adhesive strength and bonding property were measured for the curable organopolysiloxane composition formed; the results were as listed in Table I.

COMPARATIVE EXAMPLE 2

A comparative curable organopolysiloxane composition was prepared by blending uniformly 100 parts of a vinyl-containing siloxane copolymer with a vinyl content of 1 wt % and a viscosity of 7 Pa.s, made of siloxane units represented by the formula $SiO_{4/2}$, siloxy units represented by the formula $(CH_3)_3SiO_{1/2}$, and siloxy units represented by $(CH_3)_2(CH_2=CH)SiO_{1/2}$; 6 parts of dry silica powder with a BET specific surface area of 200 m²/g and having been surface-treated by hexamethyldisilazane; 6 parts of alpha, omega-tri-methylsiloxy endblocked dimethylsiloxane-methylhydrogen-siloxane copolymer with content of silicon-bonded hydrogen atoms of 0.7 wt % and a viscosity of 0.01 Pa.s; and an isopropyl alcohol solution of chloroplatinic acid in an amount corresponding to 10 ppm of the platinum metal with respect to the aforementioned organopolysiloxane mixture. In the same way as in Example 1, the adhesive strength and bonding property were measured for the curable organopolysiloxane composition formed; the results were as listed in Table I.

TABLE I

| | THIS INVENTION | COMPARATIVE EXAMPLES | |
|---|---|---|---|
| | 1 | 1 | 2 |
| Adhesive strength immediately after heat treatment, kgf/cm2 | 6 | <0.1 | 6 |
| Adhesive strength after being set under conditions of 20° C. and 55% RH for 7 days after heat treatment, kgf/cm2 | 15 | 5 | 7 |
| Bonding Property immediately after heat treatment | | | |
| Aluminum | P | * | N |
| Stainless Steel | N | * | N |
| Glass | P | * | N |
| Polycarbonate Resin | N | * | N |
| Polyphenylene Sulfide Resin | N | * | N |
| Bonding Property after being set under conditions of 20° C. and 55% RH for 7 days after heat treatment | | | |
| Aluminum | G | G | N |
| Stainless Steel | G | G | N |
| Glass | G | G | N |
| Polycarbonate Resin | G | G | N |
| Polyphenylene Sulfide Resin | G | G | N |

*Only surface portion cured

EXAMPLE 2

100 parts of an organopolysiloxane mixture prepared by uniformly blending 50 parts of alpha,omega-trimethoxysiloxy-endblocked dimethylpolysiloxane with a viscosity of 4 Pa.s and 50 parts of alpha,omega-dimethylvinylsiloxy endblocked dimethylpolysiloxane with a viscosity of 2 Pa.s were blended uniformly with 1 part of alpha,omega-trimethylsiloxy endblocked dimethylsiloxane-methylhydrogensiloxane copolymer with a content of the silicon-bonded hydrogen atoms of 0.7 wt % and a viscosity of 0.01 Pa.s, an isopropyl solution of chloroplatinic acid in an amount corresponding to 5 ppm of the platinum metal with respect to the aforementioned organopolysiloxane mixture, 1 part of methyltrimethoxysilane, and 0.5 part of diisopropoxybis-(ethylacetoacetate) titanium, forming a curable organopolysiloxane composition of this invention, Then, a sheet was prepared from a composition prepared by uniformly blending 100 parts of alpha,omega-hydroxydimethylsiloxy endblocked dimethylpolysiloxane with a viscosity of 12 Pa.s, 10 parts of dry silica powder with a BET specific surface area of 200 m²/g, 4 parts of methyltrimethoxysilane, and 0.3 part of dibutyltin dilaurate. The composition was formed to a sheet, which was set under conditions of 20° C. and 55% RH for 3 days, forming a cured silicone elastomeric sheet.

The curable organopolysiloxane composition of this invention prepared above was coated onto the aforementioned cured silicone elastomeric sheet, followed by heating at 120° C. in a hot-air-circulating oven for 15 min, then setting under conditions of 20° C. and 55% RH for 7 days. The curing state of the obtained curable organopolysiloxane composition and the bonding property on the cured silicone sheet were observed. The results were as listed in Table II.

COMPARATIVE EXAMPLE 3

100 parts of alpha,omega-hydroxydimethylsiloxy endblocked dimethylpolysiloxane with a viscosity of 4 Pa.s were blended uniformly with 10 parts of vinyltrimethoxysilane and 0.02 part of acetic acid. The mixture was stirred and heated at 120° C. for 4 h for a condensation reaction, followed by processing under a reduced pressure to remove by-product methanol and excess vinyltrimethoxysilane, forming alpha,omega-vinyldimethoxysiloxy endblocked dimethylpolysiloxane with a viscosity of 4.5 Pa.s. 100 parts of the obtained alpha,omega-vinyldimethoxysiloxy endblocked dimethylpolysiloxane were then uniformly blended with 1 part of alpha,omega-trimethylsiloxy endblocked dimethylsiloxane-methylhydrogensiloxane copolymer with a content of the silicon-bonded hydrogen atoms of 0.7 wt % and a viscosity of 0.01 Pa.s, and an isopropyl solution of chloroplatinic acid in an amount corresponding to 10 ppm of the platinum metal with respect to the aforementioned alpha,omega-vinyldimethoxysiloxy endblocked dimethylpolysiloxane, forming a comparative curable organopolysiloxane composition. Then, in the same way as in Example 2, the adhesive strength and bonding property were measured for the curable organopolysiloxane composition formed; the results were as listed in Table II.

COMPARATIVE EXAMPLE 4

A comparative curable organopolysiloxane composition was prepared in the same way as in Example 2, except that the methyltrimethoxysilane and diisopropoxybis(ethylacetoacetane)titanium of Example 2 were not added in this case. In the same way as in Example 2, the adhesive strength and bonding property were measured for the curable organopolysiloxane composition formed; the results were as listed in Table II.

COMPARATIVE EXAMPLE 5

A comparative curable organopolysiloxane composition was prepared in the same way as in Example 2, except that instead of the diisopropoxybis(ethylacetoacetate)titanium of Example 2, 0.5 part of dibutyltin dilaurate was added in this case. In the same way as in Example 2, the adhesive strength and bonding property were measured for the curable organopolysiloxane composition formed. The results were as listed in Table II.

EXAMPLE 3

50 parts of vinyl-containing siloxane copolymer with a vinyl group content of 1 wt %, a viscosity of 7 Pa.s, and made of siloxane units represented by formula $SiO_{4/2}$, siloxy units represented by the formula $(CH_3)_3SiO_{1/2}$, and siloxy units represented by $(CH_3)_2(CH_2=CH)SiO_{1/2}$; 3 parts of dry silica powder with a BET specific surface area of 200 $m^2/g$ and having been surface-treated by hexamethyldisilazane; 2 parts of diiso-propoxybis(ethylacetoacetate) titanium; and an isopropyl alcohol solution of chloroplatinic acid in an amount corresponding to 10 ppm of the platinum metal with respect to the aforementioned vinyl-containing siloxane copolymer were blended uniformly to form composition (I) liquid.

50 parts of alpha,omega-trimethoxysiloxy endblocked dimethylpolysiloxane with a viscosity of 15 Pa.s were blended uniformly with 3 parts of dry silica powder with a BET specific surface area of 200 $m^2/g$ and having been surface-treated by hexamethyldisilazane, 3 parts of alpha,omega-trimethylsiloxy endblocked dimethylsiloxane-methylhydrogensiloxane copolymer with a viscosity of 0.01 Pa.s and a content of the silicon-bonded hydrogen atoms of 0.7 wt %, 2 parts of methyltrimethoxy-silane, and 0.05 part of 2-phenyl-3-butyl-2-ol, forming composition (II) liquid.

After said compositions (I) and (II) were prepared, about 55 parts of said composition (I) and about 58 parts weight of said composition (II) were uniformly blended, forming a curable organopolysiloxane composition of this invention. The curable organopolysiloxane composition was heat-treated at 120° C. in a hot-air-circulating oven for 30 min, forming a cured silicone substance. The hardness of the cured silicone substance formed was measured using a JIS A hardness meter, defined in JIS K 6301. After setting at 20° C. and 55% RH for 7 days, the hardness of the cured silicone substance was measured in the same way as above. Also, after said compositions (I) and (II) were prepared, they were stored in sealed glass bottles, respectively, and were set in this state at 20° C. and 55% RH for 7 days. Then, about 55 parts by weight of said composition (I) and about 58 parts by weight of said composition (II) were uniformly blended, forming a curable organopolysiloxane composition of this

TABLE II

|  | THIS INVENTION | COMPARATIVE EXAMPLES | | |
| --- | --- | --- | --- | --- |
|  | 2 | 3 | 4 | 5 |
| Alpha,omega-trimethoxysiloxy endblocked dimethylpolysiloxane, parts | 50 | 0 | 50 | 50 |
| Alpha,omega-dimethylvinylsiloxy endblocked dimethylpolysiloxane, parts | 50 | 0 | 50 | 50 |
| Alpha,omega-vinyldimethoxysiloxy endblocked dimethylpolysiloxane, parts | 0 | 100 | 0 | 0 |
| Methyltrimethoxysilane, parts | 1 | 0 | 0 | 1 |
| Diisopropoxybis(ethylacetoacetonate) titanium, parts | 0.5 | 0 | 0 | 0 |
| Dibutyltin dilaurate, parts | 0 | 0 | 0 | 0.5 |
| State immediately after heat treatment | cured | uncured | uncured | * |
| Bonding property immediately after heat treatment | G | N | N | N |
| State after being set under conditions of 20° C. and 55% RH for 7 days after heat treatment | cured | uncured | uncured | gel form |
| Bonding Property after being set under conditions of 20° C. and 55% RH for 7 days after heat treatment | G | N | N | P |

*Only surface portion cured invention. The curable organopolysiloxane composition was heat-treated at 120° C. in a hot-air-circulating oven for 30 min, forming a cured silicone substance. The hardness of the cured silicone substance formed was measured in the same way as above. After setting at 20° C. and 55% RH for 7 days, the hardness of the cured silicone substance was measured in the same way as above. The results were as listed in Table III.

EXAMPLE 4

100 parts of an organopolysiloxane mixture prepared by uniformly blending 50 parts of alpha,omega-trimethoxysiloxy endblocked dimethylpolysiloxane with a viscosity of 15 Pa.s and 50 parts of vinyl containing siloxane copolymer with a viscosity of 7 Pa.s, a content of vinyl of 1 wt %, and made of siloxane units represented by the formula $SiO_{1/2}$, siloxy units repre-sented by the formula $(CH_3)_3SiO_{1/2}$, and siloxy units represented by $(CH_3)_2(CH_2=CH)SiO_{1/2}$ were blended uniformly with 6 parts of dry silica powder with a BET specific surface area of 200 m$^2$/g and having been surface treated by hexamethyldi-silazane; 3 parts of alpha, omega-trimethylsiloxy endblocked dimethylsilox-anemethylhydrogensiloxane copolymer with a viscosity of 0.01 Pa.s and a content of silicon-bonded hydrogen atoms of 0.7 wt %; an isopropyl alcohol solution of chloro-platinic acid in an amount corresponding to 5 ppm of the platinum metal with respect to the aforementioned organopolysiloxane mixture; 2 parts of methyltrimethoxysilane; 2 parts of diisopropoxybis(ethylacetoacetate)titanium; and 0.05 part of 2-phenyl-3-butyl-2-ol, forming a single-liquid curable organopolysiloxane composition of this invention.

Immediately after preparation, the curable organopolysiloxane composition was heat-treated at 120° C. in a hot-air-circulating oven for 30 min, forming a cured silicone substance. The hardness of the cured silicone substance formed was measured using a JIS A hardness meter, defined in JIS K 6301. After setting at 20° C. and 55% RH for 7 days, the hardness of the cured silicone substance was measured in the same way as above. Also, after said composition was prepared, it was stored in a sealed glass bottle at 20° C. and 55% RH for 7 days. Then, the curable organopolysiloxane composition was heat-treated at 120° C. in a hot-air-circulating oven for 30 min, forming a cured silicone substance. The hardness of the cured silicone substance formed was measured in the same way as above. After setting at 20° C. and 55% RH for 7 days, the hardness of the cured silicone substance was measured in the same way as above. The results were as listed in Table III.

TABLE III

|  | THIS INVENTION | |
|---|---|---|
|  | 3 | 4 |
| Curable organopolysiloxane composition immediately after preparation | | |
| Hardness of silicone rubber immediately after heat treatment | 25 | 25 |
| Hardness of silicone rubber after setting at 20° C. and 55% RH for 7 days after heat treatment | 35 | 35 |
| Curable organopolysiloxane composition after setting at 20° C. and 55% RH for 7 days after preparation | | |
| Hardness of silicone rubber immediately after heat treatment | 24 | 15 |
| Hardness of silicone rubber after setting at 20° C. and 55% RH for 7 days after heat treatment | 35 | 23 |

EFFECTS OF THE INVENTION

The curable organopolysiloxane composition comprises components (A)–(E) and cures freely uninhibited by moisture or heat; the cured silicone substance formed has excellent adhesive strength to various substrates when the composition is cured in contact with them. The curable organopolysiloxane composition exhibits no change of curing property over time during storage when it is in the form of a 2-liquid composition.

That which is claimed is:

1. A curable organopolysiloxane composition consisting essentially of the following components:
    (A) 100 parts by weight of an organopolysiloxane mixture of (a) an alkoxy-organopolysiloxane with a viscosity at 25° C. of 0.020 to 1,000 Pa.s and at least two silicon-bonded alkoxy groups in each molecule and (b) an alkenyl-organopolysiloxane with a viscosity at 25° C. of 0.020 to 1,000 Pa.s and at least two silicon-bonded lower alkenyl groups in each molecule;
    (B) an organohydrogenpolysiloxane having at least two silicon-bonded hydrogen atoms in each molecule and said organohydrogenpolysiloxane being present in a weight amount to ensure that there are 0.3–5 mols silicon-bonded hydrogen atoms in component (B) for 1 mol of the silicon-bonded lower alkenyl groups in the composition;
    (C) 0.1–20 parts by weight of an alkoxysilane, based on 100 parts by weight of (A), represented by the following formula or its partial hydrolysis condensate:

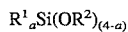

where $R^1$ represents a monovalent hydrocarbon group, $R^2$ represents an alkyl group or alkoxy group-substituted alkyl group, and a is 0, 1, or 2;
    (D) 0.01–20 parts by weight of titanium catalyst for a condensation reaction, based on 100 parts by weight of (A); and
    (E) a catalytic amount of hydrosilylation reaction catalyst.

2. The curable organopolysiloxane composition according to claim 1 in which (a) is present in an amount of from 10 to 90 weight percent and (b) is present in an amount of from 10 to 90 weight percent, the sum of (a) and (b) being 100 weight percent, and (a) plus (b) being (A).

3. The curable organopolysiloxane composition according to claim 2 in which the alkoxy-organopolysiloxane of (a) is represented by the following general formula

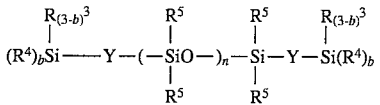

where $R^3$ represents a monovalent hydrocarbon group, $R^4$ represents an alkoxy group, $R^5$ represents a monovalent hydrocarbon group, Y represents an oxygen atom or bivalent hydrocarbon radical, b is 1, 2, or 3, n represents a number corresponding to a polymer with a viscosity at 25° C. of 0.02 to 1,000 Pa.s and (b) is an alkenyl-organopolysiloxane which has a straight-chain structure.

4. The curable organopolysiloxane composition according to claim 2 in which the alkoxy-organopolysiloxane of (a) is represented by the following general formula

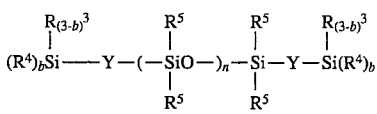

where $R^3$ represents a monovalent hydrocarbon group, $R^4$ represents an alkoxy group, $R^5$ represents a monovalent hydrocarbon group, Y represents an oxygen atom or bivalent hydrocarbon radical, b is 1, 2, or 3, n represents a number corresponding to a polymer with a viscosity at 25° C. of 0.02 to 1,000 Pa.s and (b) is an alkenyl-organopolysiloxane which has a resin structure.

5. The curable organopolysiloxane composition according to claim 4 in which the alkenyl-organopolysiloxane resin structure of component (b) has the following siloxane units represented by the formula $SiO_{4/2}$, siloxy units represented by the formula $(CH_3)_3SiO_{1/2}$, and siloxy units represented by $(CH_3)_2(CH_2=CH)SiO_{1/2}$.

6. The curable organopolysiloxane composition according to claim 3 in which the viscosity of the alkoxy-organopolysiloxane of component (a) is from 0.1 to 500 Pa.s, the viscosity of the alkenyl-organopolysiloxane of component (b) is from 0.1 to 500 Pa.s, the viscosity of the organohydrogenpolysiloxane of component (B) is from 0.001 to 10 Pa.s, (C) is present in an amount of from 1 to 10 parts by weight, (D) is present in an amount of from 0.1 to 5 parts by weight, (E) is a platinum compound and is present in an amount of from 0.1 to 1,000 parts by weight platinum per 1,000,000 parts by weight of (A).

7. The curable organopolysiloxane composition according to claim 4 in which the viscosity of the alkoxy-organopolysiloxane of component (a) is from 0.1 to 500 Pa.s, the viscosity of the alkenyl-organopolysiloxane of component (b) is from 0.1 to 500 Pa.s, the viscosity of the organohydrogenpolysiloxane of component (B) is from 0.001 to 10 Pa.s, (C) is present in an amount of from 1 to 10 parts by weight, (D) is present in an amount of from 0.1 to 5 parts by weight, (E) is a platinum compound and is present in an amount of from 0.1 to 1,000 parts by weight platinum per 1,000,000 parts by weight of (A).

8. The curable organopolysiloxane composition according to claim 6 in which (a) is present in an amount of from 40 to 60 weight percent, (b) is present in an amount of from 40 to 60 weight percent, (a) and (b) equal 100 weight percent, and equal (A), the alkoxy-organopolysiloxane of (a) has a viscosity of 1 to 25 Pa.s where $R^3$ is methyl, $R^4$ is methoxy, $R^5$ is methyl; the organohydrogenpolysiloxane of component (B) is from 0.005 to 1 Pa.s and the organic groups are methyl; the alkoxysilane of (C) is methyltrimethoxysilane, the titanium catalyst of (D) is diisopropoxybis(ethylacetoacetate)titanium, and the platinum compound of component (E) is present in an amount of from 0.5 to 200 parts by weight per 1,000,000 parts by weight of component (A).

9. The curable organopolysiloxane composition according to claim 7 in which (a) is present in an amount of from 40 to 60 weight percent, (b) is present in an amount of from 40 to 60 weight percent, (a) and (b) equal 100 weight percent, and equal (A), the alkoxy-organopolysiloxane of (a) has a viscosity of 1 to 25 Pa.s where $R^3$ is methyl, $R^4$ is methoxy, $R^5$ is methyl; the organohydrogenpolysiloxane of component (B) is from 0.005 to 1 Pa.s and the organic groups are methyl; the alkoxysilane of (C) is methyltrimethoxysilane, the titanium catalyst of (D) is diisopropoxybis(ethylacetoacetate)titanium, and the platinum compound of component (E) is present in an amount of from 0.5 to 200 parts by weight per 1,000,000 parts by weight of component (A).

10. The curable organopolysiloxane composition according to claim 9 in which the alkenyl-organopolysiloxane resin structure of component (b) has the following siloxane units represented by the formula $SiO_{4/2}$, siloxy units represented by the formula $(CH_3)_3SiO_{1/2}$, and siloxy units represented by $(CH_3)_2(CH_2=CH)SiO_{1/2}$.

11. A curable organopolysiloxane composition consisting essentially of a two-container liquid composition made of composition (I) and composition (II) where the sum amount of component (a) and component (b) is 100 parts by weight:

(1) composition (I) consisting essentially of
(b) an alkenyl-organopolysiloxane with a viscosity at 25° C. of 0.02 to 1,000 Pa.s and at least two silicon-bonded lower alkenyl groups in each molecule;
(D) 0.01–20 parts by weight of a titanium catalyst for a condensation reaction, based on 100 parts by weight of component (a) and component (b); and
(E) a catalytic amount of a hydrosilylation reaction catalyst;

(2) composition (II) consisting essentially of organopolysiloxane selected from the group consisting of
(a) an alkoxy-organopolysiloxane with a viscosity at 25° C. of 0.02 to 1,000 Pa.s and at least two silicon-bonded alkoxy groups in each molecule, and
(A) an organopolysiloxane mixture of (a) an alkoxy-organopolysiloxane with a viscosity at 25° C. of 0.02 to 1,000 Pa.s and at least two silicon-bonded alkoxy groups in each molecule, and (b) an alkenyl-organopolysiloxane with a viscosity at 25° C. of 0.02 to 1,000 Pa.s and at least two silicon-bonded alkenyl groups in each molecule;
(B) an organohydrogenpolysiloxane which has at least two silicon-bonded hydrogen atoms in each molecule and said organohydrogenpolysiloxane being present in a weight amount to ensure that there are 0.3 to 5 mols of silicon-bonded hydrogen atoms in component (B) for one mol of silicon-bonded lower alkenyl group in the composition; and
(C) 0.1–20 parts by weight of the alkoxysilane, based on 100 parts by weight of component (a) and component (b) in composition (I) and composition (II), represented by the formula or its partial hydrolysis condensate

$$R^1{}_a Si(OR^2)_{(4-a)}$$

where $R^1$ represents a monovalent hydrocarbon group, $R^2$ represents an alkyl group or alkoxy group-substituted alkyl group, and a is 0, 1, or 2.

12. The curable organopolysiloxane composition according to claim 11 in which (a) is present in an amount of from 10 to 90 weight percent and (b) is present in an amount of from 10 to 90 weight percent, the sum of (a) and (b) being 100 weight percent, and (a) plus (b) being (A).

13. The curable organopolysiloxane composition according to claim 12 in which the alkoxy-organopolysiloxane of (a) is represented by the following general formula

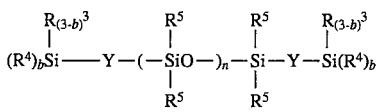

where $R^3$ represents a monovalent hydrocarbon group, $R^4$ represents an alkoxy group, $R^5$ represents a monovalent hydrocarbon group, Y represents an oxygen atom or bivalent hydrocarbon radical, b is 1, 2, or 3, n represents a number corresponding to a polymer with a viscosity at 25° C. of 0.02 to 1,000 Pa.s and (b) is an alkenyl-organopolysiloxane which has a straight-chain structure.

14. The curable organopolysiloxane composition according to claim 12 in which the alkoxy-organopolysiloxane of (a) is represented by the following general formula

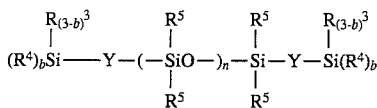

where $R^3$ represents a monovalent hydrocarbon group, $R^4$ represents an alkoxy group, $R^5$ represents a monovalent hydrocarbon group, Y represents an oxygen atom or bivalent hydrocarbon radical, b is 1, 2, or 3, n represents a number corresponding to a polymer with a viscosity at 25° C. of 0.02 to 1,000 Pa.s and (b) is an alkenyl-organopolysiloxane which has a resin structure.

15. The curable organopolysiloxane composition according to claim 14 in which the alkenyl-organopolysiloxane resin structure of component (b) has the following siloxane units represented by the formula $SiO_{4/2}$, siloxy units represented by the formula $(CH_3)_3SiO_{1/2}$, and siloxy units represented by $(CH_3)_2(CH_2=CH)SiO_{1/2}$.

16. The curable organopolysiloxane composition according to claim 13 in which the viscosity of the alkoxy-organopolysiloxane of component (a) is from 0.1 to 500 Pa.s, the viscosity of the alkenyl-organopolysiloxane of component (b) is from 0.1 to 500 Pa.s, the viscosity of the organohydrogenpolysiloxane of component (B) is from 0.001 to 10 Pa.s, (C) is present in an amount of from 1 to 10 parts by weight, (D) is present in an amount of from 0.1 to 5 parts by weight, (E) is a platinum compound and is present in an amount of from 0.1 to 1,000 parts by weight platinum per 1,000,000 parts by weight of (A).

17. The curable organopolysiloxane composition according to claim 14 in which the viscosity of the alkoxy-organopolysiloxane of component (a) is from 0.1 to 500 Pa.s, the viscosity of the alkenyl-organopolysiloxane of component (b) is from 0.1 to 500 Pa.s, the viscosity of the organohydrogenpolysiloxane of component (B) is from 0.001 to 10 Pa.s, (C) is present in an amount of from 1 to 10 parts by weight, (D) is present in an amount of from 0.1 to 5 parts by weight, (E) is a platinum compound and is present in an amount of from 0.1 to 1,000 parts by weight platinum per 1,000,000 parts by weight of (A).

18. The curable organopolysiloxane composition according to claim 16 in which (a) is present in an amount of from 40 to 60 weight percent, (b) is present in an amount of from 40 to 60 weight percent, (a) and (b) equal 100 weight percent, and equal (A), the alkoxy organopolysiloxane of (a) has a viscosity of 1 to 25 Pa.s where $R^3$ is methyl, $R^4$ is methoxy, $R^5$ is methyl; the organohydrogenpolysiloxane of component (B) is from 0.005 to 1 Pa.s and the organic groups are methyl; the alkoxysilane of (C) is methyltrimethoxysilane, the titanium catalyst of (D) is diisopropoxy-bis(ethylacetoacetate)titanium, and the platinum compound of component (E) is present in an amount of from 0.5 to 200 parts by weight per 1,000,000 parts by weight of component (A).

19. The curable organopolysiloxane composition according to claim 17 in which (a) is present in an amount of from 40 to 60 weight percent, (b) is present in an amount of from 40 to 60 weight percent, (a) and (b) equal 100 weight percent, and equal (A), the alkoxy-organopolysiloxane of (a) has a viscosity of 1 to 25 Pa. s where $R^3$ is methyl, $R^4$ is methoxy, $R^5$ is methyl; the organohydrogenpolysiloxane of component (B) is from 0.005 to 1 Pa.s and the organic groups are methyl; the alkoxysilane of (C) is methyltrimethoxysilane, the titanium catalyst of (D) is diisopropoxy-bis (ethylacetoacetate) titanium, and the platinum compound of component (E) is present in an amount of from 0.5 to 200 parts by weight per 1,000,000 parts by weight of component (A).

20. The curable organopolysiloxane composition according to claim 19 in which the alkenyl-organopolysiloxane resin structure of component (b) has the following siloxane units represented by the formula $SiO_{4/2}$, siloxy units represented by the formula $(CH_3)_3SiO_{1/2}$, and siloxy units represented by $(CH_3)_2(CH_2=CH)SiO_{1/2}$.

* * * * *